United States Patent
Maier et al.

(10) Patent No.: US 10,477,968 B2
(45) Date of Patent: Nov. 19, 2019

(54) INTERCHANGEABLE CUSTOMIZABLE HARDWARE FOR PULL MECHANISMS

(71) Applicant: Knockout Knobs LLC, New York, NY (US)

(72) Inventors: Nancy Maier, New York, NY (US); Daniel Gibbons, Millers Falls, MA (US); Jeremy Broadwell, Williamstown, MA (US)

(73) Assignee: KNOCKOUT KNOBS LLC, New York, NY (US)

( * ) Notice: Subject to any disclaimer, the term of this patent is extended or adjusted under 35 U.S.C. 154(b) by 265 days.

(21) Appl. No.: 15/359,425

(22) Filed: Nov. 22, 2016

(65) Prior Publication Data

US 2017/0156497 A1   Jun. 8, 2017

Related U.S. Application Data

(60) Provisional application No. 62/262,113, filed on Dec. 2, 2015.

(51) Int. Cl.
| | |
|---|---|
| *A47B 95/02* | (2006.01) |
| *E05B 1/00* | (2006.01) |
| *B33Y 50/02* | (2015.01) |
| *B33Y 80/00* | (2015.01) |

(52) U.S. Cl.
CPC .............. *A47B 95/02* (2013.01); *B33Y 50/02* (2014.12); *B33Y 80/00* (2014.12); *E05B 1/0015* (2013.01); *E05B 1/0084* (2013.01); *A47B 2095/024* (2013.01); *A47B 2095/028* (2013.01)

(58) Field of Classification Search
CPC .............. A47B 95/02; A47B 2095/024; A47B 2095/028; E05B 1/0015; E05B 1/0084; Y10T 16/46; Y10T 16/462; Y10T 16/4636; B33Y 50/02; B33Y 80/00
USPC ...... 16/414, 415, 417; D8/305; 40/325, 331, 40/332
See application file for complete search history.

(56) References Cited

U.S. PATENT DOCUMENTS

| | | | | |
|---|---|---|---|---|
| 3,024,555 | A | * | 3/1962 | Abeles .................. E05B 1/0007 16/433 |
| 3,758,920 | A | | 9/1973 | Dobrjanskyj et al. |
| 5,499,427 | A | * | 3/1996 | Bowman ................ A47B 95/02 16/417 |
| 6,242,064 | B1 | * | 6/2001 | Howie, Jr. ............... A44B 1/06 150/155 |
| 6,834,430 | B2 | * | 12/2004 | Worrell .................... G05G 1/10 16/414 |
| 6,842,946 | B2 | | 1/2005 | Hayden |
| 7,111,365 | B1 | * | 9/2006 | Howie, Jr. ............ E05B 1/0007 16/414 |
| 7,963,003 | B1 | | 6/2011 | Keene |
| 8,132,295 | B1 | | 3/2012 | Otis et al. |

(Continued)

*Primary Examiner* — William L Miller
(74) *Attorney, Agent, or Firm* — Leason Ellis LLP

(57) ABSTRACT

A pull assembly includes a base and a decorative insert which is rotatably mated to the base to allow for easy assembly and customization. The pully assembly can be formed by a process that includes the steps of: (a) forming a base by a first process; (b) receiving an image of a custom decorative insert that is intended to mate with the base to form the pull assembly; and (c) forming the custom decorative insert based on the received image and using an additive manufacturing process.

16 Claims, 10 Drawing Sheets

(56) References Cited

U.S. PATENT DOCUMENTS

| | | | |
|---|---|---|---|
| 8,360,488 B2 * | 1/2013 | Forrest | E05B 1/0015 |
| | | | 292/251.5 |
| 8,397,477 B2 | 3/2013 | Stephens | |
| 8,495,798 B1 * | 7/2013 | Parker | E05B 1/0007 |
| | | | 16/414 |
| D687,697 S * | 8/2013 | Troise | D8/305 |
| 8,510,915 B2 | 8/2013 | Daniels et al. | |
| 8,522,812 B2 * | 9/2013 | Rocheleau | E03B 7/09 |
| | | | 137/315.12 |
| D721,567 S * | 1/2015 | Corpuz, Jr. | D8/305 |
| 2004/0078933 A1 * | 4/2004 | Forrest | A47B 95/02 |
| | | | 16/417 |
| 2007/0069090 A1 | 3/2007 | Driscoll | |

* cited by examiner

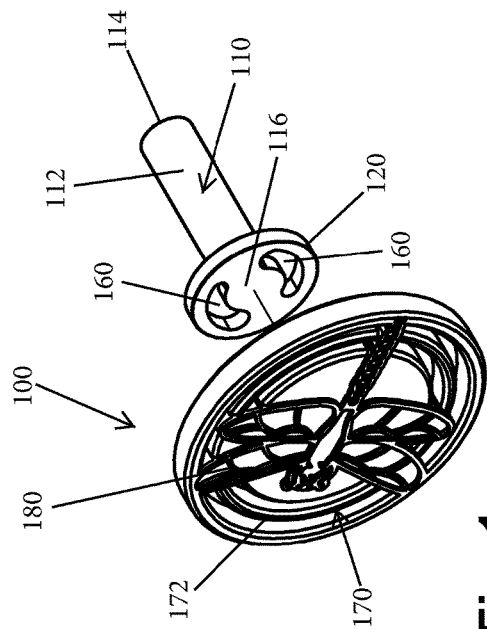
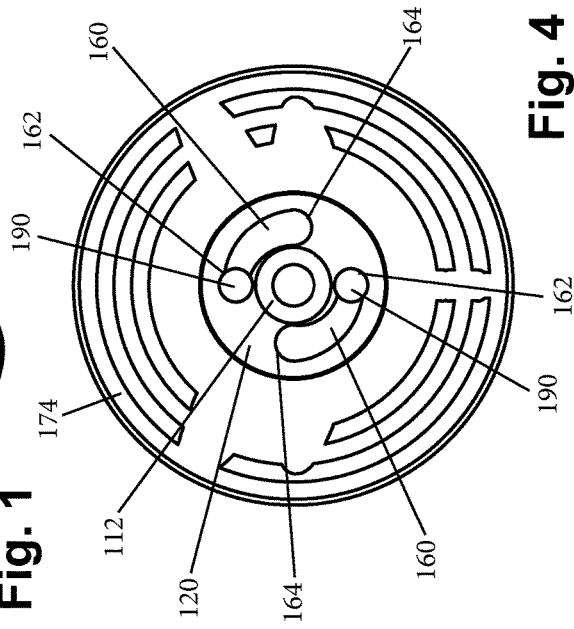
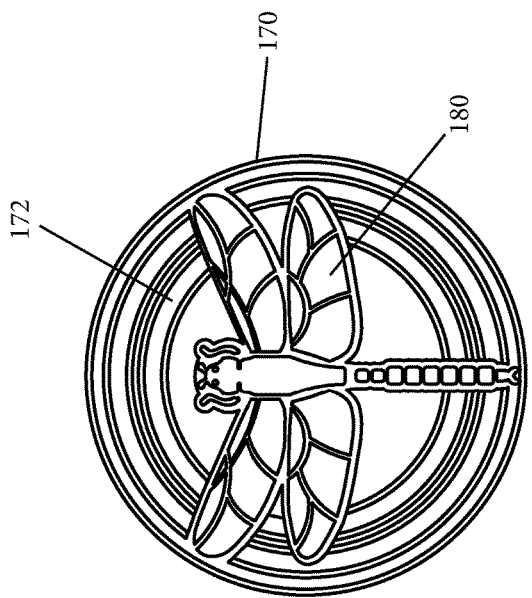
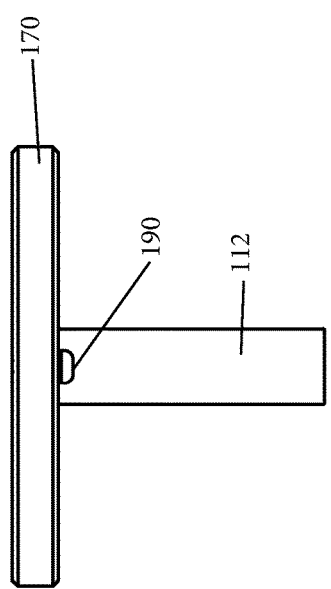
Fig. 1
Fig. 4
Fig. 3
Fig. 2

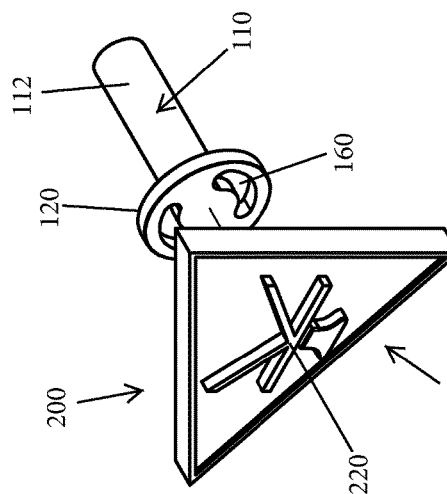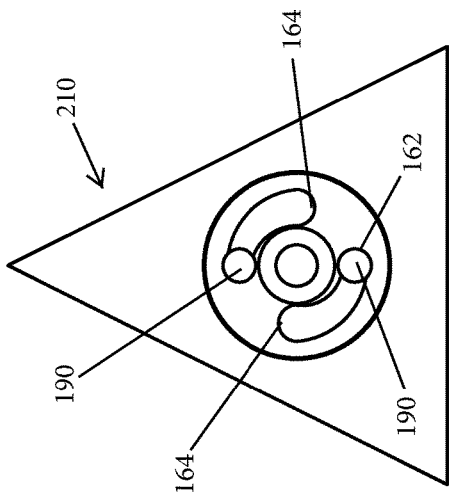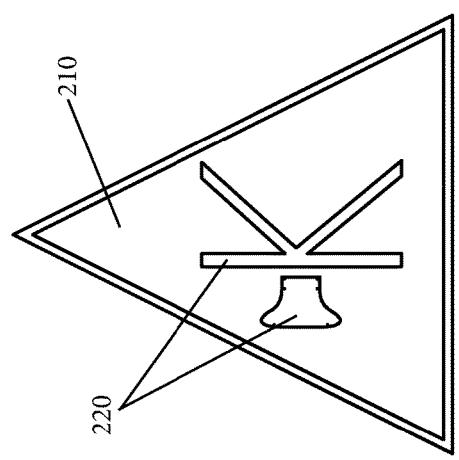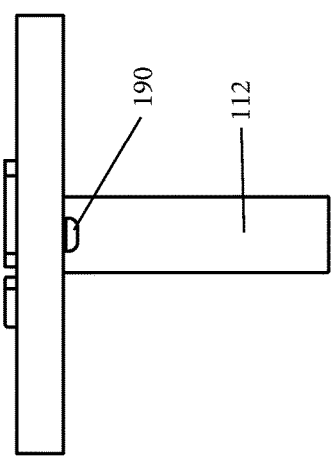

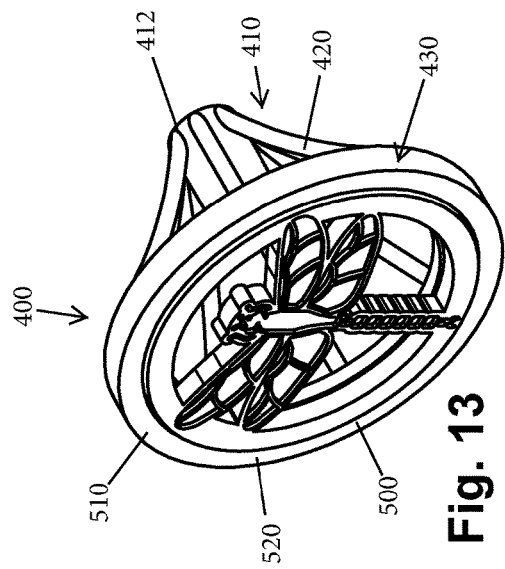
Fig. 13
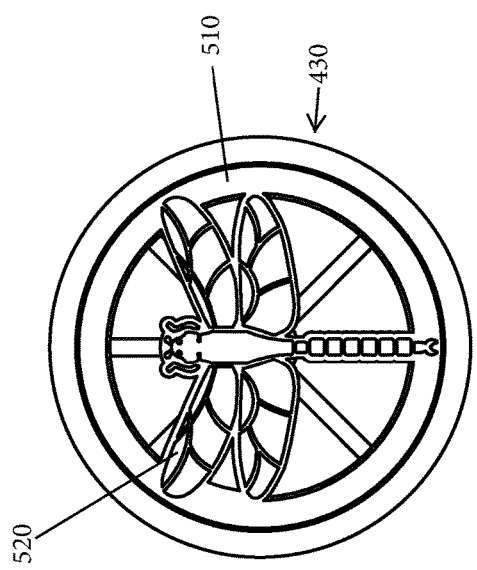
Fig. 14
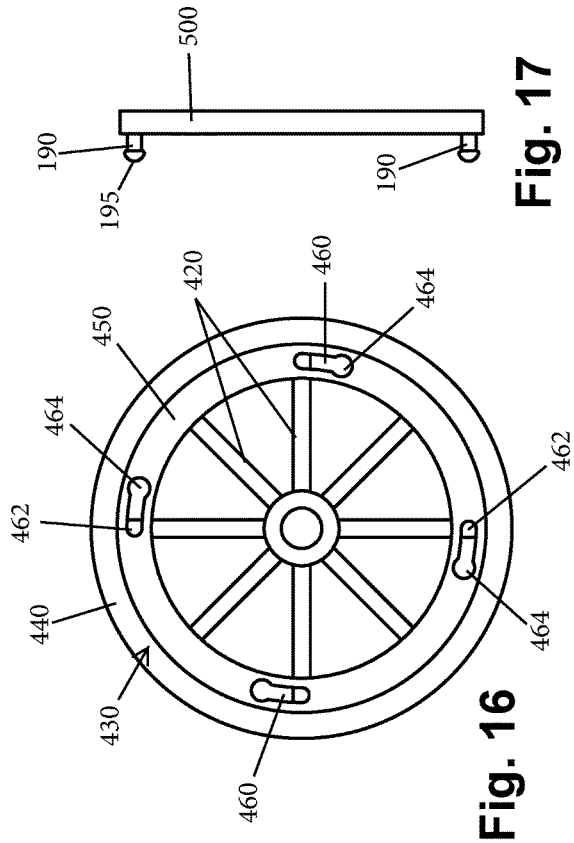
Fig. 16
Fig. 17
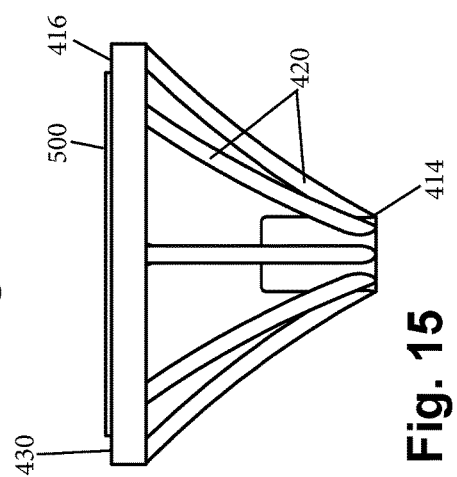
Fig. 15

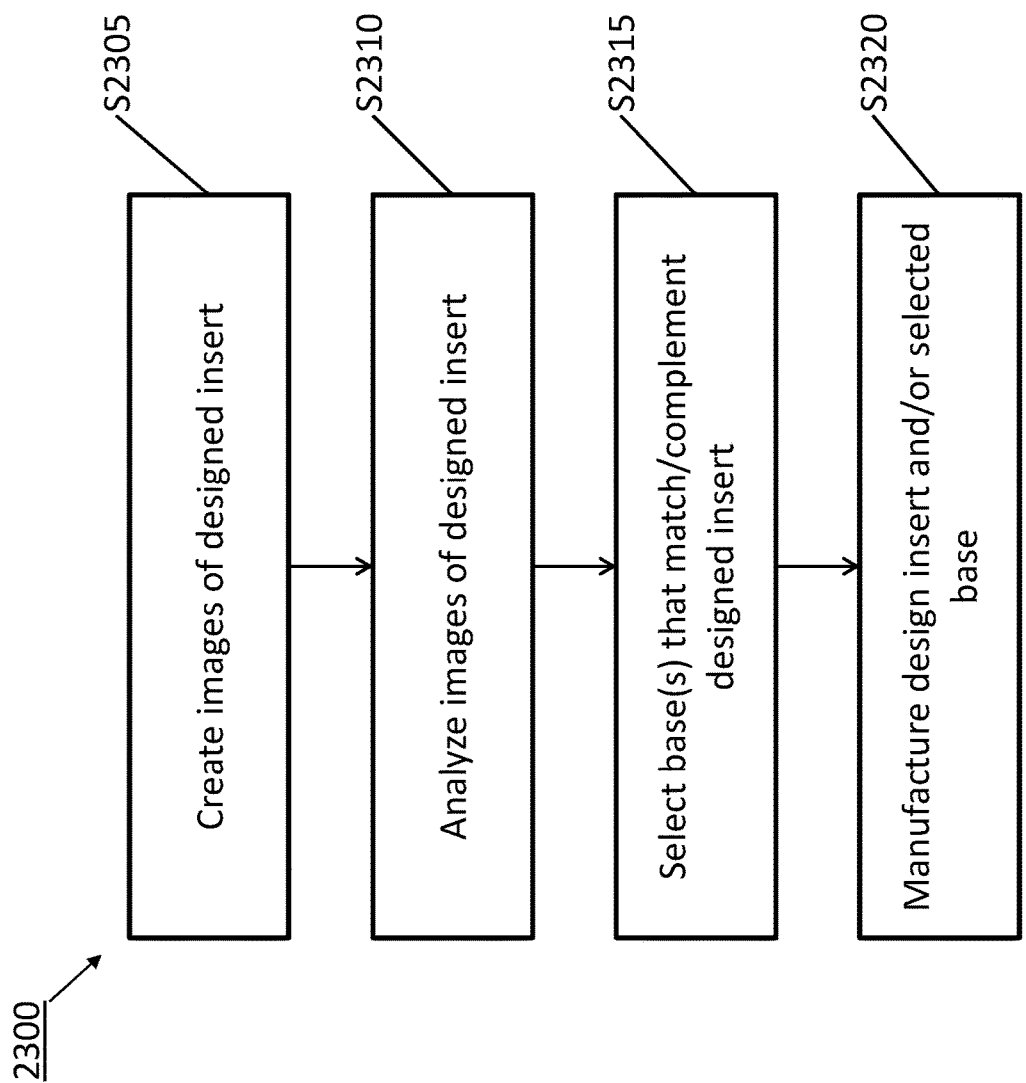

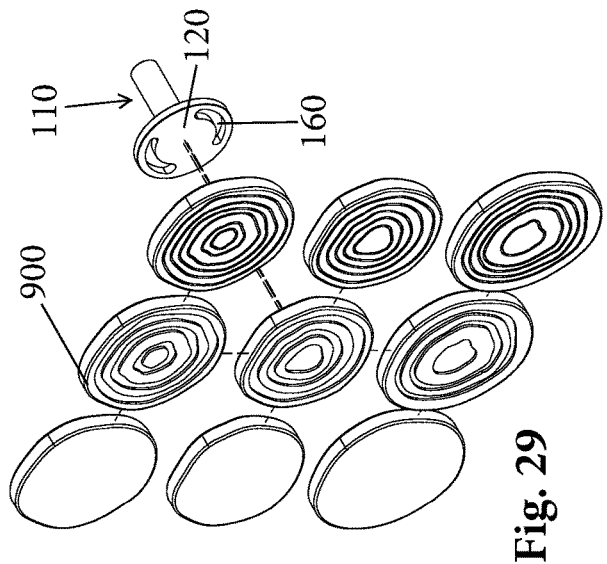
Fig. 29
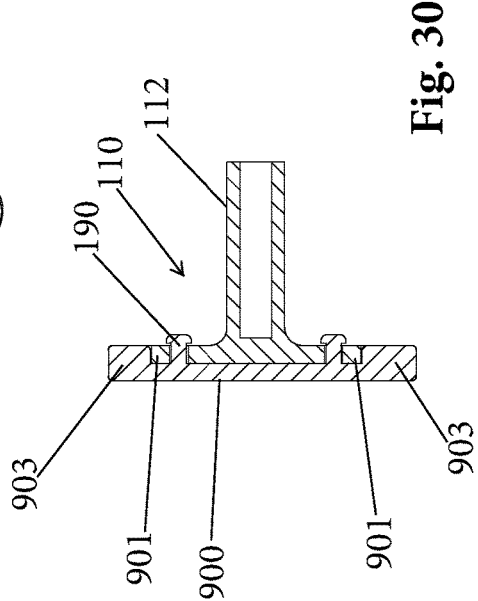
Fig. 30
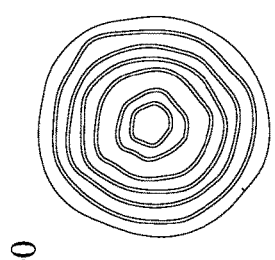
Fig. 28B
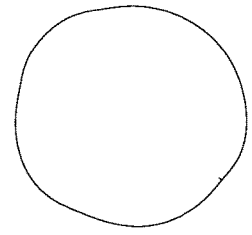
Fig. 28A
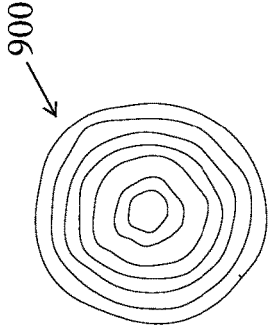
Fig. 28C
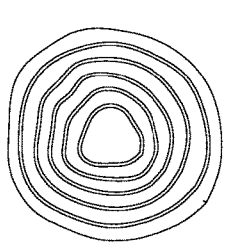
Fig. 28E
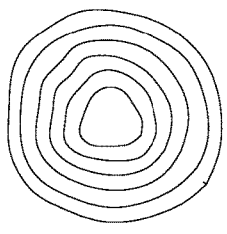
Fig. 28F
Fig. 28D
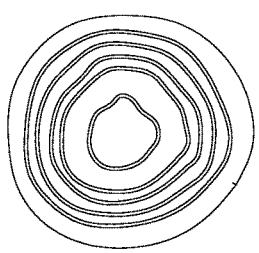
Fig. 28H
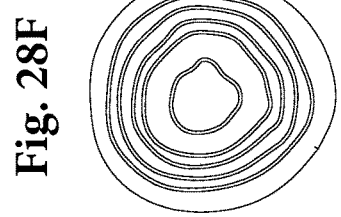
Fig. 28I
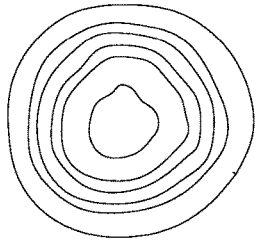
Fig. 28G
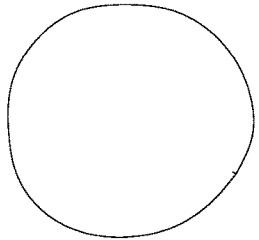

INTERCHANGEABLE CUSTOMIZABLE HARDWARE FOR PULL MECHANISMS

CROSS-REFERENCE TO RELATED APPLICATION

The present application claims the benefit of U.S. patent application Ser. No. 62/262,113, filed Dec. 2, 2015, which is hereby expressly incorporated by reference in its entirety.

TECHNICAL FIELD

The present invention relates to decorative, customized hardware and more particularly, relates to decorative, customized pull mechanisms (e.g., knobs, handles, and other pull structures) for opening doors and drawers, such as cabinet doors, drawers, and the like, and can further be implemented in hook constructions.

BACKGROUND

It is known in the art and has become increasingly more popular to affix hardware to a barrier structure (e.g., furniture, wall, door, window, etc.) and the like to facilitate manipulation (e.g., opening and closing or hanging or holding back) of storage doors and drawers that are part thereof. Such hardware can be in the form of knobs, handles, pulls, and levers affixed to the face of a barrier structure (e.g., a piece of furniture or door or window) to provide a means for a user to move the barrier structure via the movement of the pull mechanism. Pulls for opening drawers and doors may include knobs and handles. As used herein, the term "knob" is used to describe a pull mechanism that has a single point of contact with the barrier structure and the term "handle" is used to describe a pull mechanism that has multiple points of contact with the barrier structure. Kitchen, bathrooms, and other environments often include pulls for opening and closing cabinet doors, drawers, or the like. Additional hardware that is commonly used is hooks to match the pulls. Hooks are often used in bathrooms, kitchens and mudrooms to hang items.

Pulls can aesthetically enhance the surrounding environments. As an example, some decorative pulls include intricate details and accents. Such decorative pulls are especially common in household, hospitality, commercial, office and rental environments. For example, incorporating more decorative pulls into a new kitchen design enhances or changes the new kitchen's aesthetic appeal. Similarly, replacing pulls in an existing kitchen with newer pulls can update the look of the kitchen, the kitchen's theme, or otherwise change the kitchen aesthetics.

Pulls typically secure to doors or drawer faces with one or more fasteners (screws). In such an arrangement, a screw is typically extended through a door or drawer face and the knob is screwed onto the screw while the head of the screw is held stationary to securely affix the pull to the door or drawer face (the barrier structure). In a hook, the stem and screw affix to the wall or molding.

Customization of the fixture is desired by many people to provide a personal touch to the room; however, customization increases the time required to manufacture the parts and also increases costs. There is therefore a need to provide a pull assembly that can be customized (e.g., to reflect a business logo) and the appearance thereof can be easily altered, but at the same time is more cost effective.

BRIEF DESCRIPTION OF DRAWING FIGURES

FIG. 1 is a front and side exploded perspective view of a pull assembly in accordance with a first embodiment of the present invention;

FIG. 2 is a side elevation view of the pull assembly of FIG. 1 in an assembled condition;

FIG. 3 is a top view of the pull assembly of FIG. 1;

FIG. 4 is a bottom plan view of the pull assembly of FIG. 1;

FIG. 5 is a front and side exploded perspective view of a pull assembly in accordance with a second embodiment of the present invention;

FIG. 6 is a side elevation view of the pull assembly of FIG. 5 in an assembled condition;

FIG. 7 is a top view of the pull assembly of FIG. 5;

FIG. 8 is a bottom plan view of the pull assembly of FIG. 5;

FIG. 13 is a front and side perspective view of a pull assembly in accordance with a fourth embodiment of the present invention in an assembled condition;

FIG. 14 is a top plan view of the pull assembly of FIG. 13;

FIG. 15 is a side elevation view of the pull assembly of FIG. 13;

FIG. 16 is a top plan view of a base of the pull assembly of FIG. 13;

FIG. 17 is a side view of an insert of the pull assembly of FIG. 13;

FIG. 27 is a flow diagram illustrating a method of designing and manufacturing customizable pull mechanisms in accordance with one or more embodiments of the present invention;

FIGS. 28A-I illustrate different inserts for use in a pull assembly;

FIG. 29 is a perspective view showing the various inserts of FIGS. 28A-I for use with a base of the pull assembly;

FIG. 30 is a cross-sectional view of one insert mated with one base; and

Figure 31:
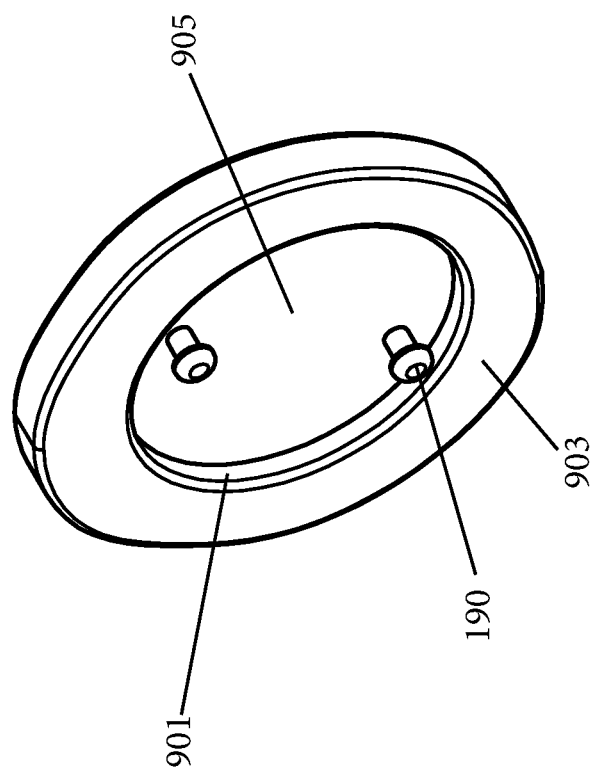

FIG. 31 is a rear perspective view of one insert.

DETAILED DESCRIPTION OF CERTAIN EMBODIMENTS

An example structure, such as a cabinet or a dresser or similar furniture, will typically have doors or drawers which are flush with the structure when closed. To facilitate opening and closing the door or drawers, a pull is typically needed. As described herein, a pull can come in a number of different forms including pull knobs and pull handles, etc.

FIGS. 1-4 illustrate a pull assembly (mechanism) 100 according to a first embodiment of the present invention. The illustrated pull assembly 100 is in the form of a knob pull that includes a base (pull body) 110 and a decorative insert (pull fascia/fascia member) 170. The base 110 includes an elongated shaft 112 that has an open first end 114 and an opposite closed second end 116. The shaft 112 can be formed to have any number of different shapes, including but not limited to, a cylinder, an oval, a square, triangle, etc., and to have any number of differences sizes and lengths, etc. As discussed herein, the shaft 112 is at least partially hollow to allow for the shaft 112 to be secured to a target surface using a fastener (e.g., a screw) or the like.

At the second end 116, a flange member 120 is formed and extends radially outward from the shaft 112. The illustrated flange member 120 has a circular shape to allow for rotation of the decorative insert 170 relative to the base 110. The details and construction of base 110 are merely exemplary and not limiting of the scope of the present invention. The flange member 120 is therefore defined by a diameter which is greater than a diameter of the cylindrical shaped shaft 112. The flange member 120 includes at least one and preferably, a plurality of locking slots 160 that are formed in the flange member 120.

As described herein, the circular shaped flange member 120 is received within a complementary circular shaped recess along one face of the decorative insert 170 to allow rotation of the decorative insert 170 relative to the base 120 as shown in FIG. 4. The shape of the body of the decorative insert in which the circular shaped recess is formed can take any number of different forms. Thus, the body of the flange member 120 seats within the complementary recess formed in the underside of the decorative insert 170 to allow for rotation of the decorative insert 170 relative to the flange member 120 which permits, as described below, a secure coupling between a coupling (locking member) associated with the underside of the decorative insert 170.

Each locking slot 160 is defined by a pair of closed ends 162, 164. The locking slot 160 has an arcuate shape and the width of the locking slot 160 varies over the length of the locking slot 160 from the end 162 to the end 164. In particular, the width of the locking slot 160 progressively increases in the direction from the end 162 to the end 164. In other words, the end 162 represents a narrow end of the slot and the end 164 represents a wider end of the slot 160. The ends 162, 164 can be curved ends as shown. When more than one slot 160 is formed in the flange member 120, the slots 160 can be located at least partially opposite one another. For example, the illustrated embodiment, the flange member 120 includes two slots 160 that are disposed opposite one another.

Since the second end 116 of the shaft 112 is closed, the center of the flange member 120 is solid so as to define a closed end that can seat in the recess formed in the underside of the decorative insert.

The shaft 112 includes an internal bore which is threaded and configured to receive a fastener (e.g., a screw) for attaching the base 110 to a structure, such as a face of a piece of furniture, such as a cabinet door or cabinet drawer (not shown). However, it will be understood that the shaft 112 is not limited to having a threaded bore construction and other means for attaching the shaft 112 to the structure/fixture (e.g., cabinet door) can be used. For example, a bore without threads can be formed in the shaft 112 to receive a fastener or connector for attaching the base 110 to the structure/fixture. In addition and according to other embodiments, the shaft 112 can be completely solid and is attached to the structure/fixture using other means, such as a fastener that connects to the shaft. It will be understood that the above described fastening techniques and well as other fastening techniques can be used with respect to any of the bases described herein and thus, the bases are not limited to having a threaded bore as the means for attaching the pull assembly to the structure/fixture.

The base 110 can be formed of any number of suitable materials including but not limited to metal or plastic or wood and can be formed using any number of conventional techniques, including casting, molding, injection molding, 3D printing, additive manufacturing, etc.

The decorative insert (pull fascia/fascia member) 170 is configured to mate with the base 110 to provide the assembled pull mechanism. The decorative insert 170 has a first face or surface 172 and an opposite second face or surface 174. In the assembled state, the first surface 172 faces outward, while the second surface 174 faces the base 110. Similar to the base 110, the decorative insert 170 can come in any number of different shapes, including but not limited to, a circle, an oval, a square, triangle, etc. and can be formed from any number of different materials. In the illustrated embodiment, the decorative insert 170 is in the form of a disk (circular shape). The decorative insert 170 can be a completely solid structure as shown or, as in other embodiments illustrated herein, the decorative insert 170 can include one or more cutouts.

The first surface 172 can include decorative indicia 180 (ornamental (decorative) features) for display. The decorative indicia 180 can consist of a wide array of different elements that provide different visual appearances. For example, the decorative indicia 180 can depict an object or represent an abstract work or present a textured pattern or can be in the form of letters and/or numbers or a logo, or a combination of one or more different elements, etc. The decorative indicia 180 can include both raised structures (elements) and recessed structures (elements) formed along the first surface 172. The decorative indicia 180 can also include more than one color. The exemplary insert 170 of FIGS. 1-4 includes decorative dragonfly artwork 180. In the illustrated embodiment, the dragonfly artwork 180 is contained within the outer perimeter of the insert 170. In other words, no part of the dragonfly artwork 180 extends beyond the circumferential perimeter of the insert 170. However, it will be appreciated that in some embodiments, one or more portions of the decorative indicia 180 (e.g., the illustrated dragonfly artwork) may extend beyond the perimeter of the insert 170. For example, tips of the wings of the dragonfly may extend beyond the perimeter of the insert 170.

The second face or surface 174 includes a means for releasably securing the decorative insert 170 to the base 110 and in particular, the second face 174 includes at least one locking pin 190 that extends outwardly therefrom. For example, the locking pin 190 can be in the form of a protrusion (e.g., having a cylindrical body) that extends outwardly from the second face 174. The locking pin 190 can be formed at a right angle relative to the second face 174. The locking pin 190 can have a uniform construction along its length or it can have a non-uniform construction. More specifically, a distal end of the locking pin 190 can include an enlarged portion 195 as shown in FIG. 17. The enlarged portion 195 can be dome shaped and have a width greater than the proximal portion (which has a cylindrical shape) of the locking pin 190 (See, FIG. 17).

Each locking pin 190 can be formed in the recess (e.g., circular shaped recess) that is formed in the underside of the decorative insert 170. In the illustrated embodiment, there are two locking pins 190 formed in the circular shaped recess formed in the underside of the decorative insert 170.

The locking pin 190 is shaped and sized so as to be capable of being receiving within the locking slot 160 and be moved therein from the end 162 to the end 164. The width of the locking slot 160 and the width of the locking pin 190 are selected such that the locking pin 190 can be freely and easily received in the end 162 of the slot 160; however, as the insert 170 is rotated relative to the base 110, the locking pin 190 travels within the locking slot 160 toward the end 164. As the locking pin 190 travels within the slot 160, the locking pin 190 frictionally contacts the sides of the slot 160 and a friction fit is formed between the locking pin 190 and the locking slot 160. When the locking pin 190 is disposed at the end 164 of the slot 160, the locking pin 190 is securely held by the base 110, thereby securely (yet releasably) locking the insert 170 to the base 110.

The curved nature of the locking slot 160 accommodates rotation of the insert 170 relative to the base 110 and thus, the pull assembly 100 of the present invention is designed to both lock and unlock by rotating the insert 170 relative to the base 110 (which is stationary due to it being fastened to the barrier structure).

The mating relationship between the insert 170 and the base 110 can thus be described as being one of a male/female type with the locking slots 160 representing the female component and the locking pins 190 representing the male component.

To release the decorative insert 170 from the base 110, the process is reversed and the decorative insert 170 is rotated in the opposite direction to apply a force that overcome the friction fit between each locking pin 190 and the second end 164 of the slot 160. Once each locking pin 190 reaches the first end 162, the decorative insert 170 can be lifted and removed from the base 110. Removal of the decorative insert 170 may be desired in certain situations, such as repair or replacement of the decorative insert 170 with a new one.

The decorative insert 170 can be formed of any number of different materials including but not limited to metals and plastics or even wood. As described herein, in one embodiment the decorative insert 170 is formed of a different material compared to the base 110 and/or is formed using a different process (technique) compared to the process used to make the base 110.

FIGS. 5-8 illustrate a pull assembly 200 according to a second embodiment. The pull assembly 200 is similar to the pull assembly 100 and therefore, like elements are numbered alike. In particular, the pull assembly 200 includes the base 110 and utilizes an insert 210 that is similar to insert 170. The decorative features 220 of the insert 210 comprise a logo, such as a corporate logo. Alternatively, the decorative features 220 can be in the form of a person's initials. The insert 210 also includes at least one locking pin 190 and preferably a plurality of locking pins 190 that are received in the locking slots 160 as described above.

Despite the fact that the insert 210 has a triangular shape, the locking pins 190 are positioned on the bottom surface thereof and spaced apart to accommodate reception in the complementary locking slots 160 and travel therein due to rotation of the insert 210. In other words and as shown in FIG. 8, the underside of the insert 210 has a circular shaped recess (similar to the prior embodiment) into which the flange 120 seats. This allows rotation of the triangular shaped insert 210 relative to the base 110. Each locking pin 190 is formed in the circular shaped recess in the underside of the insert 210.

FIGS. 9-12 illustrate a pull assembly 300 according to a third embodiment. The pull assembly 300 is similar to the pull assemblies 100, 200 and therefore, like elements are numbered alike. In particular, the pull assembly 300 includes the base 110 and utilizes an insert 310 that is similar to insert 170. In the illustrated embodiment, the decorative insert 310 is in the form of a square and the top surface thereof can include decorative indicia 320 (such as letters or a graphic representation, etc., or an artistic pattern or work, etc.). In the illustrated embodiment, the decorative insert 310 includes a raised feature 311 in the center thereof and more particularly, a raised hemisphere is located in the center of the outwardly facing surface of the insert 310. The insert 310 also includes at least one locking pin 190 and preferably a plurality of locking pins 190 that are received in the locking slots 160 as described above.

Despite the fact that the insert 310 has a square shape, the locking pins 190 are positioned within the circular shaped recess formed in the underside of the bottom surface thereof and spaced apart to accommodate reception in the complementary locking slots 160 and travel therein due to rotation of the insert 310. As in the prior embodiments, the flange member 120 seats within the circular shaped recess in the underside of the insert 310.

In the embodiments of FIGS. 1-12, the decorative inserts are solid structures and more particularly, are completely solid structures that have decorative (ornamental) features formed on the outer surface that faces the user. However, other constructions are possible as discussed herein.

As described herein, the decorative insert component of the pull mechanism represents the component that is customizable, while the base component can be mass produced and is preferably not customized. As a result, the base 110 and the complementary decorative insert can be formed using two different processes and more particularly, the base 110 can be formed using a process that is more suited for mass production and cost savings, while the decorative insert can be formed using a process that is more suited for ease of customization.

The base 110 can be formed using a number of suitable methods disclosed herein. For example, the base 110 can be formed of a metal and formed using a suitable technique, such as a metal casting process. It will be appreciated that this is merely one type of process used to make a metal part having a fixed shape/dimensions, such as the base 110. Alternatively, if the base 110 is formed of a plastic, it can be made using a molding process.

The decorative inserts disclosed herein can be formed using traditional and suitable methods that lend themselves to producing customized parts. For example, in one embodiment, the decorative insert is formed of a different material than the base 110. For example, the decorative insert can be formed of a plastic material (polymeric material), while the base can be formed of a metal.

One particularly suitable technique for manufacturing the customized decorative insert is an additive manufacturing process. Additive manufacturing or 3D printing is a process of making three dimensional solid objects from a digital file. The creation of a 3D printed object is achieved using additive processes. In an additive process, an object is created by laying down successive layers of material until the entire object is created. Each of these layers can be seen as a thinly sliced horizontal cross-section of the eventual object.

The additive manufacturing process starts with making a virtual design of the object you want to create. This virtual design is made in a CAD (Computer Aided Design) file using a 3D modeling program (for the creation of a totally new object) or with the use of a 3D scanner (to copy an existing object). A 3D scanner makes a 3D digital copy of an object. 3D scanners use different technologies to generate a 3d model such as time-of-flight, structured/modulated light, volumetric scanning and many more.

To prepare a digital file for printing, the 3D modeling software "slices" the final model into hundreds or thousands of horizontal layers. When the sliced file is uploaded in a 3D printer, the object can be created layer by layer. The 3D printer reads every slice (or 2D image) and creates the object, blending each layer with hardly any visible sign of the layers, with as a result the three dimensional object.

There are several ways to print and all those available are additive, differing mainly in the way layers are built to create the final object. Some methods use melting or softening material to produce the layers. Selective laser sintering (SLS) and fused deposition modeling (FDM) are the most common technologies using this way of printing. Another method of printing is when we talk about curing a photo-reactive resin with a UV laser or another similar power source one layer at a time. The most common technology using this method is called stereolithography (SLA).

Since 2010, the American Society for Testing and Materials (ASTM) group "ASTM F42—Additive Manufacturing", developed a set of standards that classify the Additive Manufacturing processes into 7 categories according to Standard Terminology for Additive Manufacturing Technologies. These seven processes are:

1. Vat Photopolymerisation
2. Material Jetting
3. Binder Jetting
4. Material Extrusion
5. Powder Bed Fusion
6. Sheet Lamination
7. Directed Energy Deposition The main considerations in choosing a machine are generally speed, cost of the 3D printer, cost of the printed prototype, cost and choice of materials, and color capabilities.

Printers that work directly with metals are expensive. In some cases, however, less expensive printers can be used to make a mold, which is then used to make metal parts.

The following table depicts the various techniques and materials that can be used as part of an additive manufacturing process.

| Type | Technologies | Materials |
| --- | --- | --- |
| Extrusion | Fused deposition modeling (FDM) or Fused Filament Fabrication (FFF) | Thermoplastics (e.g. PLA, ABS, HIPS, Nylon), HDPE, eutectic metals, edible materials, Rubber (Sugru), Modeling clay, Plasticine, RTV silicone, Porcelain, Metal clay (including Precious Metal Clay) |
| | Robocasting | Ceramic materials, Metal alloy, cermet, metal matrix composite, ceramic matrix composite |
| Wire | Electron Beam Freeform Fabrication (EBF[3]) | Almost any metal alloy |
| Granular | Direct metal laser sintering (DMLS) | Almost any metal alloy |
| | Electron-beam melting (EBM) | Almost any metal alloy including Titanium alloys |
| | Selective laser melting (SLM) | Titanium alloys, Cobalt Chrome alloys, Stainless Steel, Aluminium |
| | Selective heat sintering (SHS)[24] | Thermoplastic powder |
| | Selective laser sintering (SLS) | Thermoplastics, metal powders, ceramic powders |
| Powder bed and inkjet head 3D printing | Plaster-based 3D printing (PP) | Plaster |
| Laminated | Laminated object manufacturing (LOM) | Paper, metal foil, plastic film |
| Light polymerised | Stereolithography (SLA) | photopolymer |
| | Digital Light Processing (DLP) | Photopolymer |

It will also be appreciated that other manufacturing processes can be used to make the customized decorative inserts of the present invention after the custom design is generated after a consumer's request.

FIGS. 13-17 illustrate a pull assembly 400 according to a fourth embodiment. The pull assembly 400 is similar to the pull assemblies described above and therefore, like elements are numbered alike. In particular, the pull assembly 400 includes a base 410 and a decorative insert 500. In the illustrated embodiment, the base 410 includes an elongated shaft 412 and the base has an open first end 414 and an opposite open second end 416. The shaft 412 can be formed to have any number of different shapes, including but not limited to, a cylinder, an oval, a square, a triangle, etc.

The shaft 412 includes an internal bore which is threaded and configured to receive a fastener (e.g., a screw) for attaching the base 410 to a structure, such as a face of a piece of furniture, such as a cabinet door or cabinet drawer (not shown).

The base 410 includes a plurality of struts 420 each of which extends radially outward from the shaft 412 and has a distal end that connects to a support member (e.g., a ring) 430. In the illustrated embodiment, in which the shaft 412 has a cylindrical shape; the struts 420 are disposed circumferentially about the shaft 412. The struts 420 are spaced from one another and in the illustrated embodiment, a proximal end of each strut 420 is connected to the shaft 412 at or near the open first end 414 of the shaft 412. Each strut 420 can be linear in shape or it can be curved along its length. The distal end of each strut 420 preferably is attached to an underside of the support member 430. In the illustrated embodiment, the support member 430 is in the form of an annular structure (ring) that defines the end 416 of the base 410.

The support member 430 can have two distinct sections, namely, an outer section 440 and an inner section 450 that is located inside of the outer section 440. When, as illustrated, the support member 430 comprises an annular (ring shaped) structure, the outer section 440 comprises a first ring having a first diameter and an inner section 450 comprises a second ring having a second diameter that is less than the first diameter. The inner section 450 is recessed relative to the outer section 440 and therefore, a shoulder (e.g., a right angle shoulder) is formed between the inner and outer sections 450, 440. Top surfaces of each of the outer section 440 and the inner section 450 can be planar surfaces as shown.

In the illustrated embodiment, the distal ends of the struts 420 are coupled to the underside of the outer section 440.

The inner section 450 includes at least one and preferably, a plurality of locking slots 460 (that are similar to locking slots 160). Each locking slot 460 is formed entirely within the inner section 450 and is thus recessed relative to the outer section 440. Each locking slot 460 is defined by a pair of closed ends 462, 464. The locking slot 460 has an arcuate shape and the width of the locking slot 460 varies over the length of the locking slot 460 from the end 462 to the end 464. In particular, the width of the locking slot 460 progressively increases in the direction from the end 462 to the end 464. In other words, the end 462 represents a narrow end of the slot and the end 464 represents a wider end of the slot 460. The ends 462, 464 can be curved ends as shown. When more than one slot 460 is formed, the slots 460 can be located at least partially opposite one another. For example, the illustrated embodiment, the inner section 450 includes four slots 460 that are arranged in two pairs that are disposed opposite one another.

The slots 460 are also arranged such that the narrow ends 462 face in the same circumferential direction in that, as shown, the narrow ends 462 are located counterclockwise to the wider ends 464. It will also be understood that the opposite is true in that the narrow ends 462 can be located clockwise to the wider ends 464.

The base 410 can be thought of as having a basket type construction due to the presence and orientation of the spaced apart struts 420. Since the outer section 440 and inner section 450 are concentric with one another, the center of the shaft 412 is located at a center point of the outer section 440 and inner section 450.

The decorative insert 500 is similar to the decorative insert 170 in that it is intended to be removably mated to a complementary base, in this case, the base 410. Unlike the decorative insert 170, the decorative insert 500 is not a completely solid structure, but instead, the insert 500 includes one or more cutouts that define the decorative nature (ornamental features) of the insert 500.

In FIGS. 13-15, the decorative insert 500 also depicts a dragonfly image; however, unlike the completely solid insert 170, the insert 500 is defined by an outer perimeter support 510 to which the decorative indicia 520 (e.g., dragonfly) is attached and there are open spaces (through holes) between the decorative indicia 520 and the outer perimeter support 510. The outer perimeter support 510 is configured to mate with the base 410 and more specifically, the outer perimeter support 510 is sized and shaped to seat against the inner section 450. The illustrated outer perimeter support 510 can thus be in the form of a ring (annular shaped member) that seats directly on the inner surface 450.

As with the previous embodiments, an underside of the outer perimeter support 510 includes a means for releasably securing the decorative insert 500 to the base 410 and in particular, the underside of the outer perimeter support 510 includes at least one locking pin 190 that extends outwardly therefrom. For example, the locking pin 190 can be in the form of a protrusion (e.g., having a cylindrical body) that extends outwardly from a second (bottom) face. The locking pin 190 can be formed at a right angle relative to the underside of the outer perimeter support 510. The locking pin 190 can have a uniform construction along its length or it can have a non-uniform construction as shown. More specifically, a distal end of the locking pin 190 can include an enlarged portion 195. In the illustrated embodiment, the enlarged portion 195 is dome shaped and has a width greater than the proximal portion (which has a cylindrical shape) of the locking pin 190.

The locking pin 190 is shaped and sized so as to be capable of being receiving within the locking slot 460 and be moved therein from the end 462 to the end 464. The width of the locking slot 460 and the width of the locking pin 190 are selected such that the locking pin 190 can be freely and easily received in the end 462 of the slot 460; however, as the insert 500 is rotated relative to the base 410, the locking pin 190 travels within the locking slot 460 toward the end 464. As the locking pin 190 travels within the slot 460, the locking pin 190 frictionally contacts the sides of the slot 460 and a friction fit is formed between the locking pin 190 and the locking slot 460. When the locking pin 190 is disposed at the end 464 of the slot 460, the locking pin 190 is securely held by the base 410, thereby securely (yet releasably) locking the insert 500 to the base 410.

The curved nature of the locking slot 460 accommodates rotation of the insert 170 relative to the base 410 and thus, the pull assembly 100 of the present invention is designed to both lock and unlock by rotating the insert 500 relative to the base 410 (which is stationary due to it being fastened to the barrier structure).

The insert 500 preferably includes the same number of locking pins 190 as the number of locking slots 460 that are formed in the base 410. The locking pins 190 are also positioned such that all of the locking pins 190 can be aligned with the wider ends 462 of the respective locking slots 460, thereby allowing insertion of the pins 190 into the respective locking slots 460 and the subsequent rotation of the insert 500 relative to the base 410.

As shown in FIG. 15, when the insert 500 is received within the base 410, the outer perimeter support 510 seats on the inner section 450 and in particular, the thickness of the outer perimeter support 510, the thickness of the outer section 440, and the recess of the inner section 450 are selected such that the top planar surfaces of the outer section 440 and outer perimeter support 510 are flush (lie substantially in the same plane) when the insert 500 is securely locked (mated to) with the base 410. In FIG. 15, the object that lies above the top surface of the outer section 440 is the decorative indicia (dragonfly) of the insert 500.

The insert 500 is an example of a type of class of inserts that are not completely solid, as described above, and therefore, the underlying base (i.e., base 410) should be of a type that is complementary and best portrays the decorative indicia of the insert 500. In other words, the open nature of the base 410 compliments the open nature of the insert 500 and the user (observer) is able to see through to the support structure (e.g., a cabinet) to which the base 410 is mounted.

FIGS. 18-21 illustrate another insert 600 that is configured to mate with the base 410. The insert 600 has an inverse design relative to the insert 500 in that the decorative indicia 610 of the insert 600 comprises a cutout (through hole in the form of a dragonfly). The areas surrounding the decorative indicia 610 are solid and define an insert body 605. As with the insert 500, the insert 600 includes one or more and preferably a plurality of locking pins 190 that are arranged about a perimeter of the insert body 605 and arranged to be received with the locking slots 460 are described herein. Since the base 410 has an open construction and the insert 600 has an open construction (decorative indicia cutout), the user (observer) is able to see through to the support structure (e.g., a cabinet) to which the base 410 is mounted.

As previously discussed, the inserts described and illustrated herein are fully customizable and can be manufactured after the user selects the desired ornamental look (decorative indicia) for the insert. As mentioned previously, additive manufacturing processes are particularly suited for manufacturing the inserts since these processes are capable of receiving custom insert design instructions and can be used to only produce a small batch of inserts as opposed to mold manufacturing which requires a costly mold to be first prepared.

FIGS. 22-25 illustrate another pull assembly 700 including an insert 710 that is configured to mate with a base 800. The insert 710 is similar to the other inserts described herein. The insert 710 is completely solid and includes one or more locking pins 190 extending outwardly from a rear surface (e.g., in the illustrated embodiment, there are two pins 190). A front surface of the insert 710 can and preferably does include decorative indicia 715 such as any of the indicia types disclosed herein. The illustrated insert 710 has a circular shape; however, as mentioned herein, it can have other shapes.

The base 800 is similar to those described and illustrated herein. The base 800 includes a floor 810 with a raised perimeter lip 815 extending therearound. In the illustrated embodiment, the perimeter lip 815 has an annular shape. The perimeter lip 815 is thus raised relative to the floor 810. The floor 810 includes a plurality of locking slots 820 (that are similar to locking slots 160). Each locking slot 820 is formed entirely within the floor 810. Each locking slot 820 is defined by a pair of closed ends 822, 824. The locking slot 820 has an arcuate shape and the width of the locking slot 820 varies over the length of the locking slot 820 from the end 822 to the end 824. In particular, the width of the locking slot 820 progressively increases in the direction from the end 822 to the end 824. In other words, the end 822 represents a narrow end of the slot and the end 824 represents a wider end of the slot 820. The ends 822, 824 can be curved ends as shown. When more than one slot 820 is formed, the slots 820 can be located at least partially opposite one another. For example, the illustrated embodiment, the floor 810 includes two slots 820 that are arranged in one pair.

The slots 820 are also arranged such that the narrow ends 822 face in the same circumferential direction in that, as shown, the narrow ends 822 are located counterclockwise to the wider ends 824. It will also be understood that the opposite is true in that the narrow ends 822 can be located clockwise to the wider ends 824.

As with the other embodiment, the locations of the slots 820 and the locking pins 190 are arranged such that the locking pins 190 can be freely inserted into ends 824 of the slots 820.

The illustrated floor 810 includes additional openings 817 for reducing the overall material being used to make the base 800.

As in the other embodiments, the floor 810 is integrally connected to a stem 825 that includes a threaded bore 827 for receiving a fastener.

Figure 9:
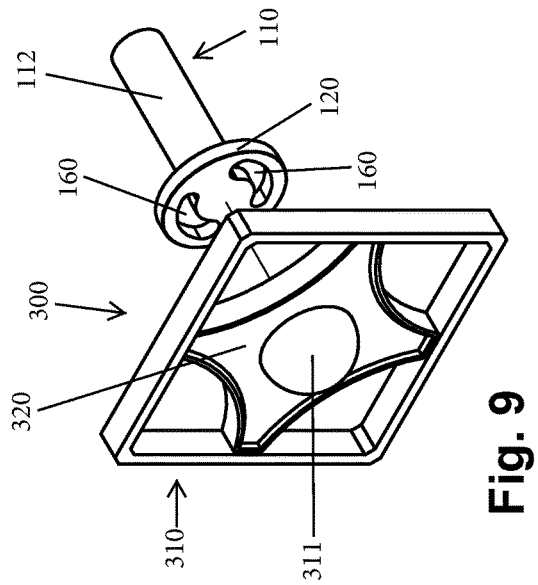
FIG. 9 is a front and side exploded perspective view of a pull assembly in accordance with a third embodiment of the present invention.
Figure 12:
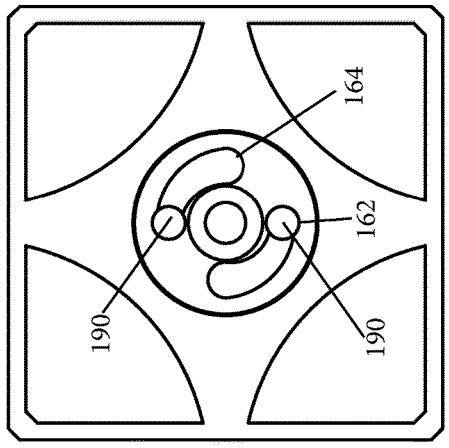
FIG. 12 is a bottom plan view of the pull assembly of FIG. 9.
Figure 11:
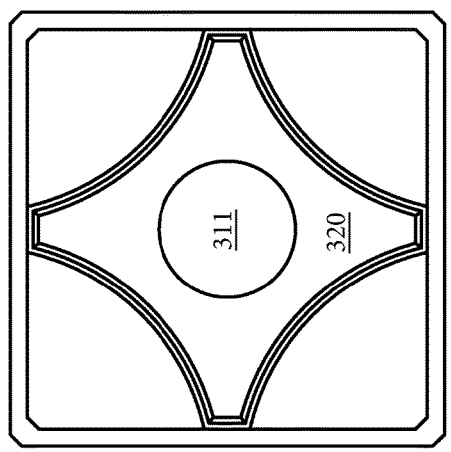
FIG. 11 is a top view of the pull assembly of FIG. 9.
Figure 10:
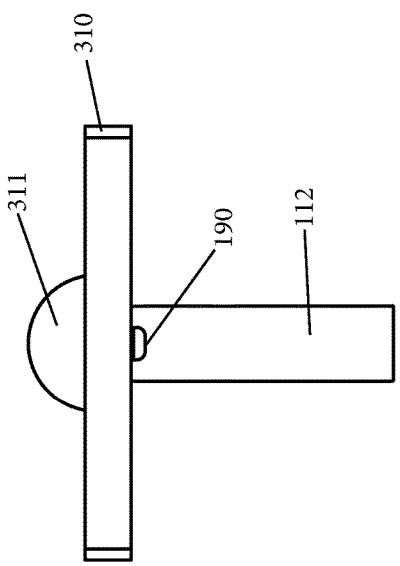
FIG. 10 is a side elevation view of the pull assembly of FIG. 9 in an assembled condition.
Figure 18:
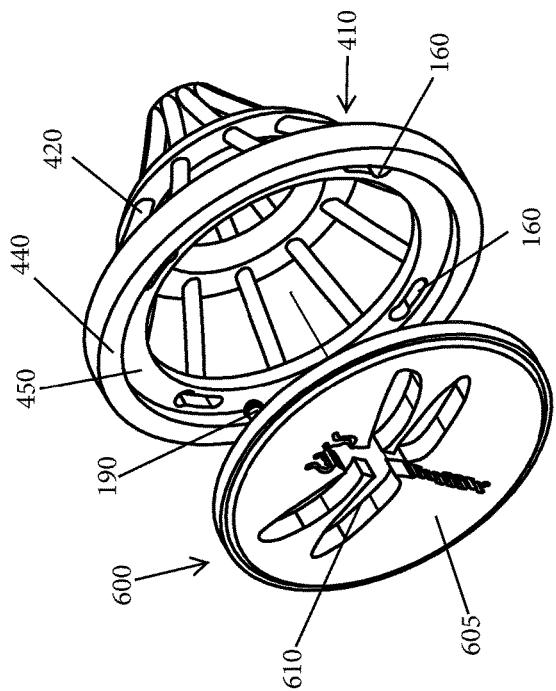
FIG. 18 is a front and side exploded perspective view of a pull assembly in accordance with a fifth embodiment of the present invention.
Figure 21:
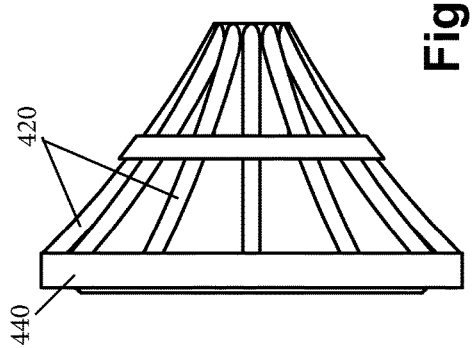
FIG. 21 is another side view of the pull assembly of FIG. 18.
Figure 19:
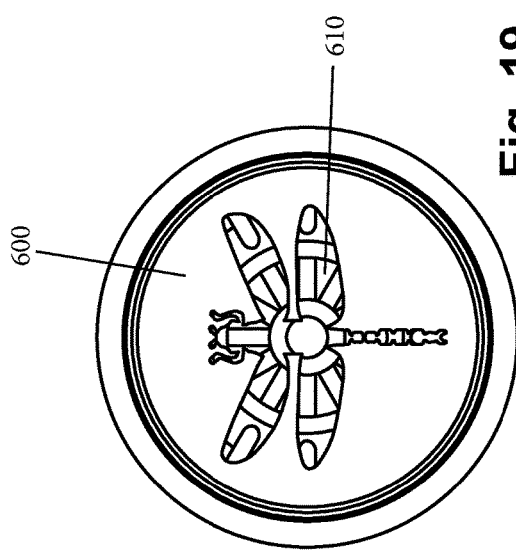
FIG. 19 is a top view of the pull assembly of FIG. 18 in an assembled condition.
Figure 20:
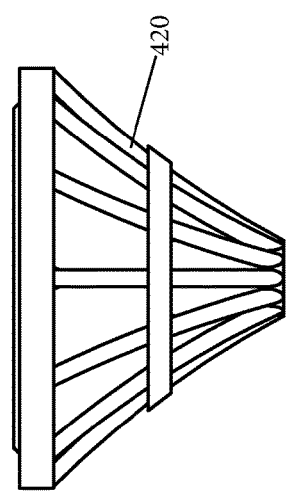
FIG. 20 is a side view of the pull assembly of FIG. 18.
Figure 22:
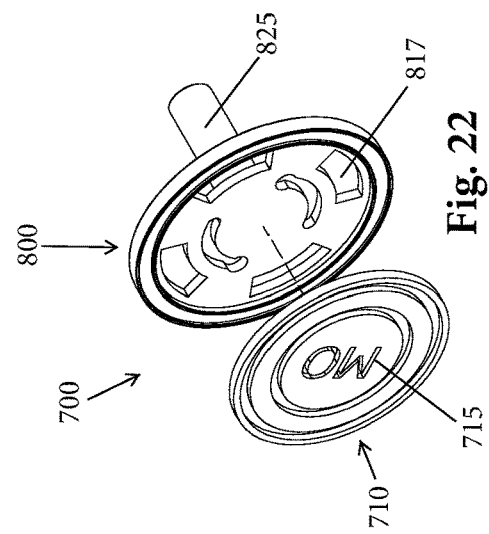
FIG. 22 is an exploded view of a pull assembly in accordance with a sixth embodiment of the present invention.
Figure 25:
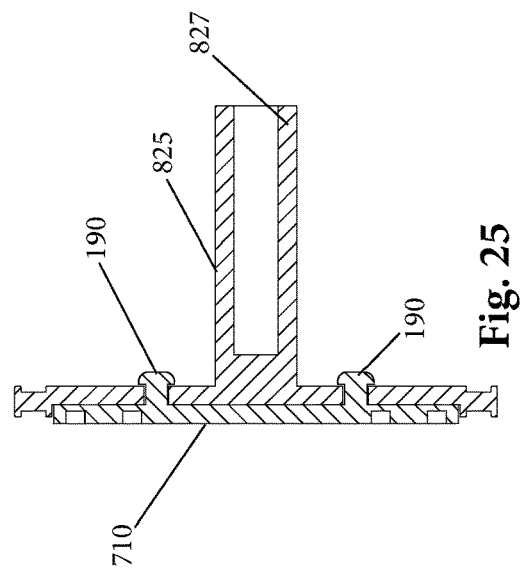
FIG. 25 is a cross-sectional view of pull assembly of FIG. 22.
Figure 24:
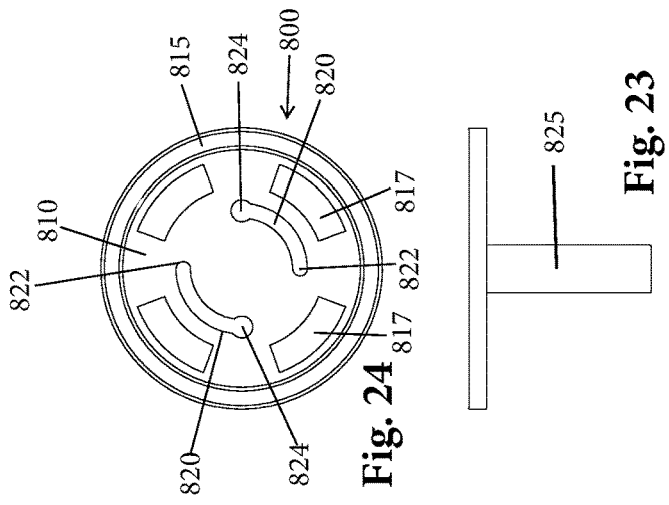
FIG. 24 is a top plan view of the base.
Figure 23:
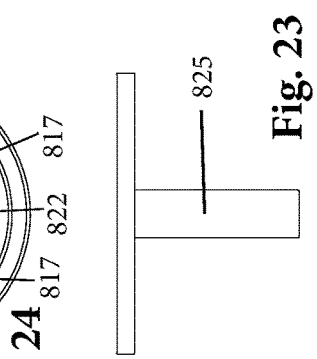
FIG. 23 is a side elevation view of a base of the pull assembly of FIG. 22.

The insert 710 and base 800 mate together as in the manner described herein with respect to the other embodiments in that a friction fit is formed therebetween. The locking pins 190 are inserted into the ends 824 of the slots 820 and the insert 710 is rotated relative to the base 800 (which is fixedly attached to a support) to cause the pins 190 to travel in the slots 820 to the narrow ends 822, thereby causing the insert 710 to be securely attached to the base 800. FIG. 25 shows the enlarged ends 195 of the pins 190 being captured below the floor 810 when the pins 190 are rotated within the respective slots.

FIGS. 28A-I show different inserts 900 according to the present invention. A front face of the inserts 900 can either be smooth (e.g., FIG. 28A); include wide grooves (e.g., FIG. 28B) or include small grooves (e.g., FIG. 28C). FIG. 31 shows a rear face of the insert 900. In this embodiment, the rear face is defined by a center recessed portion 905 surrounded by a raised peripheral portion 903. A shoulder 901 is formed between the portions 903, 905. When the insert has a circular shape, the center recessed portion 905 has a circular shape and the peripheral portion 903 has an annular shape. The locking pins 190 are located within the portion 905 and extend outwardly therefrom.

As shown in FIG. 30, when the base 110 mates with insert 900, the flange member 120 of the base 110 is received within the center recessed portion 905 and the locking pins 190 are received in the locking slots 160 as in the other embodiments. The reception of the flange member 120 in the center recessed portion 905 is such that the insert 900 can rotate relative to the base 110 to allow the insert 900 to move between the unlocked and locked positions.

It will also be appreciated and understood that it is within the scope of the present invention, that in some embodiments, the locations of the locking pins and locking slots can be reversed in that the locking pins can protrude from the flange member 120 and the locking slots can be formed in a portion of the underside of the decorative insert (while still not passing completely through the decorative face of the decorative insert).

Computer Implemented System and Method

Figure 26:
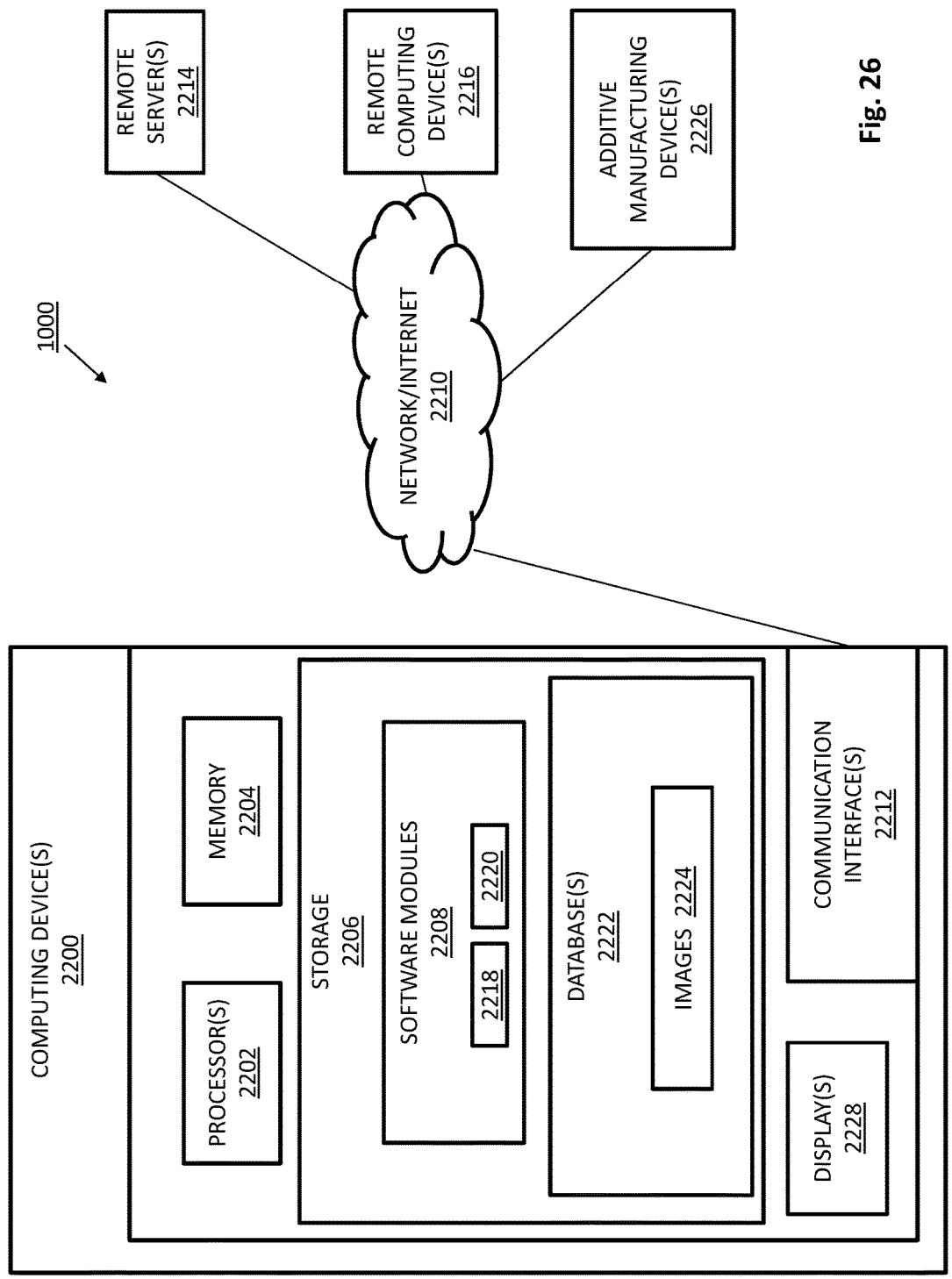
FIG. 26 is a high level diagram illustrating an exemplary configuration of a computer implemented system for designing and/or manufacturing customizable pull mechanisms in accordance with one or more embodiments of the present invention.

The design and/or manufacturing of the pull mechanisms disclosed herein can optionally be part of a computer implemented system 1000. As shown in FIG. 26, the system 1000 includes one or more computing devices 2200. The computing device(s) 2200 can be in the form of a personal computer, a mobile device, a tablet, a work pad, etc.

As described herein, the computer implemented system 1000 can be thought of as having two distinct phases, namely, (1) a design phase in which a user creates the decorative attributes (ornamental features) of the insert and (2) a manufacturing phase in which an insert is manufactured having the design that was created in the design phase. Typically, at least part of the design phase will include the use of a CAD system (software) that allows a user to create a design. Since the CAD software replaces a manual drafting process, the created design is stored in a file that can be later retrieved by another piece of equipment, such as manufacturing equipment. In accordance with one aspect of the present invention, the computer implemented system 1000 can also include software that analyzes certain aspects of the insert design and automatically selects at least one base that matches and complements the designed insert, thereby optimizing the overall aesthetic appearance of the pull mechanism.

For example, in at least one embodiment, the user can first create or design a decorative insert. For instance, the decorative insert can be created using a 3D modelling program on computing device 2200. The user can then store images of the designed insert on the computing device. Subsequently, analysis software can then be used by the user to analyze the images of the designed insert by evaluating one or more properties of the insert (e.g., shape of insert, dimensions of insert). Based on the analyzed properties of the designed insert, the user can then direct the analysis software to select one or more bases that best matches and/or complements the designed insert. Finally, the user can direct the analysis software to configure a printer (e.g., 3D printer) to manufacture the designed insert based on the received images of the designed insert and/or manufacture the selected base.

The referenced systems and methods for designing and manufacturing pull mechanisms are now described more fully with reference to the accompanying drawings, in which one or more illustrated embodiments and/or arrangements of the systems and methods are shown. The systems and methods are not limited in any way to the illustrated embodiments and/or arrangements or particular uses as the illustrated embodiments and/or arrangements described below are merely exemplary of the systems and methods, which can be embodied in various forms or functions, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

An exemplary computer system is shown in FIG. 26, which is a high-level diagram illustrating an exemplary configuration of the computer implemented system 1000. The system 1000 includes one or more computing devices 2200. In one arrangement, computing device(s) 2200 a can be a personal computer or server. In other implementations, computing device(s) 2200 can be a tablet computer, a laptop computer, or a mobile device/smartphone or retail kiosk, for example. It should be understood that computing device(s) 2200 of the system 1000 can be practically any computing device and/or data processing apparatus capable of embodying the systems and/or methods described herein. As understood by those of skill in the art, the computing device 2200 can comprise a host machine that runs one or more of the modules in a virtualized environment, and, as such, can be scaled or executed on a variety of machines. In one implementation, the computer implemented system is configured and includes software that communicates with a design creator, a seller and an end user, to allow the end user to upload a proposed design that then is processed by the other parties.

The computing device 2200 includes one or more hardware processors 2202 and at least one memory 2204. Processor(s) 2202 serve to execute instructions for software that can be loaded into memory 2204. The computing device 2200 can also include storage 2206. Memory 2204 and/or storage 2206 are preferably accessible by processor(s) 2202, thereby enabling processor(s) 2202 to receive and execute instructions stored on memory 2204 and/or on storage 2206. Memory 2204 can be, for instance, at least one random access memory (RAM) or any other suitable volatile or non-volatile computer readable storage medium. In addition, memory 2204 can be fixed or removable. Storage 2206 can take various forms, depending on the particular implementation. For example, storage 2206 can contain one or more components or devices such as a hard drive, a flash memory, a rewritable optical disk, a rewritable magnetic tape, or some combination of the above. Storage 2206 can also be fixed or removable.

One or more software modules 2208 are encoded in storage 2206 and/or in memory 2204. The software modules 2208 can comprise one or more software programs or applications having computer program code or a set of instructions executed in processor 2202. Such computer program code or instructions for carrying out operations for aspects of the systems and methods disclosed herein can be written in any combination of one or more programming languages, including an object oriented programming language, such as, PHP, C#, VB, Ruby, Java, Smalltalk, C++, Python, and JavaScript, or the like. The program code can execute entirely on computing device 2200, partly on computing device 2200, as a stand-alone software package, partly on computing device 2200 and partly on a remote computer/device, or entirely on the remote computer/device or server. In the latter scenario, the remote computer can be connected to computing device 2200 through any type of network, including a local area network (LAN) or a wide area network (WAN), or the connection can be made to an external computer (for example, through the Network/Internet 2210 using an Internet Service Provider).

One or more software modules 2208, including program code/instructions, are located in a functional form on one or more computer readable storage devices (such as memory 2204 and/or storage 2206) that can be selectively removable. The software modules 2208 can be loaded onto or transferred to computing device 2200 for execution by processor(s) 2202. It should be understood that in some illustrative embodiments, one or more of software modules 2208 can be downloaded over a network to storage 2206 via one or more network interfaces 2212 from another device or system for use within the computing device 2200. For instance, program code stored in a computer readable storage device in remote server(s) 2214 or remote computing device(s) 2216 can be downloaded over Network/Internet 2210 from the server(s) 2214 or device(s) 2216 to the computing device 2200.

Preferably, included among the software modules 2208 is a CAD program (3D modelling program) 2218 and an analysis application 2220, which are executed by processor 2202. During execution of the software modules 2208, and specifically the CAD program 2218 and the analysis application 2220, the processor 2202 configures the computing device 2200 to perform various operations relating to the customizable pull assembly. For example, the CAD program 2218 can be used by the user to create a design for a decorative insert and thereby create images of the designed images, which can be saved locally to computing device 2200, or saved remotely. Additionally, the analysis application 2220 can be used by the user to analyze the images of the designed insert in order to select a complementary base for the insert. The various operations of the CAD program 2218, the analysis application 2220, and other software modules will be described in greater detail below.

With continued reference to FIG. 26, one or more databases 2222 are also preferably stored in storage 2206. As will be described in greater detail below, database(s) 2222 can contain and/or maintain various data items and elements that are utilized throughout the various operations of system 1000, including but not limited to, images 2224 of decorative inserts and/or different bases for the pull assembly. It should be noted that although database(s) 2222 is depicted as being configured locally to computing device 2200, in certain implementations database(s) 2222 and/or various of the data elements stored therein can be located remotely (such as on a remote server 2214 or remote computing device 2216) and connected to computing device 2200 through Network/Internet 2210, in a manner known to those having ordinary skill in the art.

As referenced above, it should be noted that in certain implementations, such as the one depicted in FIG. 26, one or more user remote devices (e.g., remote server(s) 2214, remote computing device(s) 2216, additive manufacturing device(s) 2226) can be in periodic or ongoing communication with computing device 2200 thorough a computer network such as the Internet 2210.

As also referenced above, network interface(s) 2212 can be any interface that enables communication between the computing device 2200 and external devices, machines and/or elements. Preferably, network interface(s) 2212 include, but are not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 2200 to other computing devices and/or communication networks such as private networks and the Internet 2210. Such connections can include a wired connection or a wireless connection (e.g. using the IEEE 802.11 standard), though it should be understood that communication interface(s) 140 can be practically any interface that enables communication to/from the computing device 2200.

As referenced above, the system 1000 can include one or more additive manufacturing devices 2226 (e.g., 3D printer). In the embodiment as shown in FIG. 26, device 2226 is a standalone device that can communicate with computing device 2200 using the network interface 2212 via the Internet 2210. However, it should be understood that in one or more embodiments, the device 2226 can be operatively connected to the computing device 2200. In one or more embodiments, the device 2226 can receive and execute "printing related" commands from the user via computing device 2200. In these embodiments, the computing device 2200 can include printer driver(s) that communicate with printer firmware associated with device 2226. As such, the printer driver works with a translator or the like to translate user commands into a language the device 2226 understands, directs the device 2226 regarding what to do with the command, manages other tasks that the device 2226 can be doing, and instructs the device 2226 to carry out the commands of the user.

With continued reference to FIG. 26, in one or more embodiments, the computing device(s) 2200 can further include one or more input devices such as a keyboard, mouse, track ball and the like, and a display 2228. The display 2228 can include a screen or any other such presentation device that enables the system to instruct or otherwise provide feedback to the user regarding the operation of the system 1000. By way of example, display 2228 can be a digital display such as an LCD display, a CRT, an LED display, or other such 2-dimensional display as would be understood by those skilled in the art. By way of further example, a user interface and the display 2228 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, control functions, etc. So when the touch screen is touched, interface communicates this change to processor(s) 2202, and settings can be changed or user entered information can be captured and stored in the memory 2204.

Thus, illustrative embodiments and arrangements of the present systems and methods provide a computer implemented method, and computer system for providing a customizable pull assembly. The operations of the computer implemented system 1000 and the various elements and components described above will be further appreciated with reference to a method for designing and manufacturing customizable pull mechanisms as described below, with reference to FIG. 27.

FIG. 27 shows a flow diagram of routine 2300, which illustrates a broad aspect of a method for designing and manufacturing customizable pull mechanisms. It should be appreciated that several of the logical operations described herein are implemented (1) as a sequence of computer implemented acts or program modules running on computer implemented system 1000, and/or (2) as interconnected machine logic circuits or circuit modules within the system 1000. The implementation is a matter of choice dependent on the requirements of the device (e.g., size, energy, consumption, performance, etc.). Accordingly, the logical operations described herein are referred to variously as operations, steps, structural devices, acts, or modules. As referenced above, several of these operations, steps, structural devices, acts and modules can be implemented in software, in firmware, in special purpose digital logic, and any combination thereof. It should also be appreciated that more or fewer operations can be performed than shown in the figures and described herein.

With reference to FIG. 27, the process begins at step S2305 where the user creates images of the designed decorative insert. More specifically, the processor 2202, executing one or more software modules 2208 (in particular, CAD program 2218), configures the computing device 2200 to create one or more images 2222 of a designed insert. As mentioned above, the CAD program 2218 can be used by the user to design a decorative insert for the pull assembly. When the design of the decorative insert is complete, a digital file is created that comprises hundreds or thousands of layers (e.g., 2D images of the decorative insert. The 2D images (2224) can then be stored in the database 2222 for later use with the analysis application 2220 and/or remote devices. Again, the database 2222 can be configured locally to the computing device 2200 or, in certain embodiments, can be located remotely (such as on a remote server 2214 or remote computing device 2216) and connected to computing device 2200 through Network/Internet 2210.

In an alternative embodiment, the decorative insert can be designed manually (e.g., without use of a computing device), and a physical prototype of the insert can be scanned using a 3D scanner to create a digital copy (e.g., digital file of 2D images) of the insert. The digital file can then be transmitted from the 3D scanner to the computing device 2200 and saved in the database 2222.

At step S2310, the processor 2202, executing one or more software modules 2208 (in particular, analysis application 2220), configures the computing device 2200 to analyze the images 2224 of the designed insert by evaluating one or more properties of the insert. In one or more embodiments, the one or more properties of the designed insert that can be evaluated can include but are not limited to the following: (1) the shape of the insert; (2) dimensions of the insert; (3) the material of the insert; (4) the decorative indicia of the insert and its location relative to the surrounding non-decorative portion of the insert; (5) whether or not a center point of the insert falls within an opening formed in the insert or lies within a solid portion of the insert; and (6) an evaluation of a plurality of other points defined along the surface of insert to determine whether these points fall within one or more openings formed in the insert or lie within one or more solid portions of the insert.

At step S2315, the processor 2202, executing one or more software modules 2208 (in particular, analysis application 2220), can then configure the computing device(s) 2200 to select one or more bases that best matches and/or complements the designed insert based on the analyzed properties of the designed insert. In particular, the analysis application 2220 can select one or more complementary bases for the designed insert based on the analyzed properties of the insert (gleaned from the 2D images) and corresponding properties of the potential bases (which can be analyzed from the images of the bases). Like the images of the designed decorative insert, Images of the potential bases can be stored in the database 2222.

In one or more embodiments, the selected base(s) can be shown on one or more displays 2228 of the computing device 2200 for the user. In at least one implementation, in an instance in which multiple bases are selected as a match to the designed insert, the user can then choose a base from the selection of bases shown on the display 2228. In one or more implementations, the multiple bases selected by the computing device can be shown on the display 2228 in order of which base most closely complements the designed insert.

Finally, at step S2320, the processor 2202, executing one or more software modules 2208, can configure additive manufacturing device 2226 (e.g., a 3D printer) to 1) manufacture the designed insert based on the stored 2D images of the designed insert and/or 2) manufacture the selected complementary base based on the stored 2D images of the selected base. Specifically, the device 2226 can receive and execute "printing related" commands from the user via computing device 2200. As mentioned above, in one or more embodiments, the computing device 2200 can include printer driver(s) that communicate with printer firmware associated with device 2226. As such, the printer driver works with a translator or the like to translate user commands into a language the device 2226 understands, directs the device 2226 regarding what to do with the command. More specifically, the device 2226 can receive the 2D images of the insert and/or the selected based, and translate user commands to 1) read the 2D images of the insert and/or base and 2) create the object(s) based on the images.

It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems and methods disclosed herein.

It should also be understood that although some of the foregoing description has been directed to systems and methods for designing and/or manufacturing customizable pull assemblies, the system and methods disclosed herein can be similarly deployed and/or implemented in scenarios, situations, and settings far beyond the referenced scenarios. It can be readily appreciated that system 1000 can be effectively employed in one or more scenarios where in-person, real-world transactions can have advantages over virtual or electronic methods. It should be further understood that any such implementation and/or deployment is within the scope of the system and methods described herein.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Overall, the subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A pull assembly comprising:
a base having a first portion that defines a first end and a stem that defines a second end, wherein the first portion includes at least one locking slot that has an arcuate shape; and
an insert that has a first face that faces outward and includes decorative indicia and a second face that faces inwards and includes at least one locking pin, the locking pin being configured to be freely received within the locking slot and is movable to a locked position and the insert is securely coupled to the base by a friction fit being formed between the insert and the base;
wherein the at least one locking slot has a first end and an opposing second end, wherein a width of the locking slot varies along the length thereof from the first end to the second end, wherein the at least one locking pin is initially received within the second end which has an enlarged width relative to the first end and in the locked position, the at least one locking pin is disposed at or proximate to the first end of the locking slot.

2. The pull assembly of claim 1, wherein there are at least two locking slots and at least two corresponding locking pins, each locking slot decreasing in a direction from the second end to the first end.

3. The pull assembly of claim 2, wherein the at least two locking slots are formed such that the second end of one locking slot is located closer to the first end of another locking slot such that the width of each locking slot narrows in the same circumferential direction.

4. The pull assembly of claim 1, wherein the base is formed of a first material and by a first process and the insert is formed of a second material and by a second process.

5. The pull assembly of claim 4, wherein the first material is different than the second material and the first process is different than the second process.

6. The pull assembly of claim 1, wherein the base comprises a cast metal structure and the insert comprises a metal structure formed by an additive manufacturing process.

7. The pull assembly of claim 1, wherein the at least one pin comprises a cylindrically shaped pin that has a diameter that is at least substantially equal to the width of the at least one locking slot at the first end of the at least one locking slot.

8. A pull assembly comprising:
a base having a first portion that defines a first end and a stem that defines a second end, wherein the first portion includes at least one locking slot that has an arcuate shape; and
an insert that has a first face that faces outward and includes decorative indicia and a second face that faces inwards and includes at least one locking pin, the locking pin being configured to be freely received within the locking slot and is movable to a locked position and the insert is securely coupled to the base by a friction fit being formed between the insert and the base;
wherein the first portion comprises an annular shaped track that is connected to the stem by a plurality of struts that are disposed circumferentially about the stem.

9. The pull assembly of claim 8, wherein the annular shaped track includes an inner annular shaped portion and an outer annular shaped portion which is elevated relative to the inner annular shaped portion so as to form an annular shaped shoulder therebetween, wherein the insert is configured to rotatably seat within the annular shaped track.

10. The pull assembly of claim 9, wherein the at least one locking slot is formed in the inner annular shaped portion.

11. The pull assembly of claim 9, wherein each spoke is connected at a first end to an underside of the outer annular shaped portion and at a second end to an outer surface of the stem.

12. The pull assembly of claim 11, wherein the stem is open at both a first end and a second end that is closer to but spaced from the annular shaped track so as to elevate the annular shaped track relative to the stem.

13. The pull assembly of claim 9, wherein the insert includes a support portion and a decorative portion, wherein the support portion is configured to seat within the inner annular shaped portion and be constricted by the outer annular shaped portion.

14. The pull assembly of claim 13, wherein a thickness of the support portion is at least substantially equal to a height of the annular shaped shoulder.

15. The pull assembly of claim 13, wherein the support portion comprises a solid structure and the decorative portion comprises a cutout formed in the disc.

16. A pull assembly comprising:
a base having a first portion that defines a first end and a stem that defines a second end, wherein the first portion includes at least one locking slot that has an arcuate shape; and
an insert that has a first face that faces outward and includes decorative indicia and a second face that faces inwards and includes at least one locking pin, the locking pin being configured to be freely received within the locking slot and is movable to a locked position and the insert is securely coupled to the base by a friction fit being formed between the insert and the base;
wherein the first portion comprises an annular shaped track that is connected to and spaced from the stem, the insert being rotatably coupled to the annular shaped track such that the insert rotates to a locked position, the annular shaped track including a recessed landing on which the insert sits and rotates, while a perimeter lip of the first portion circumferentially surrounds and is raised relative to the annular shaped track and also circumferentially surrounds the insert.

* * * * *